Patented July 1, 1947

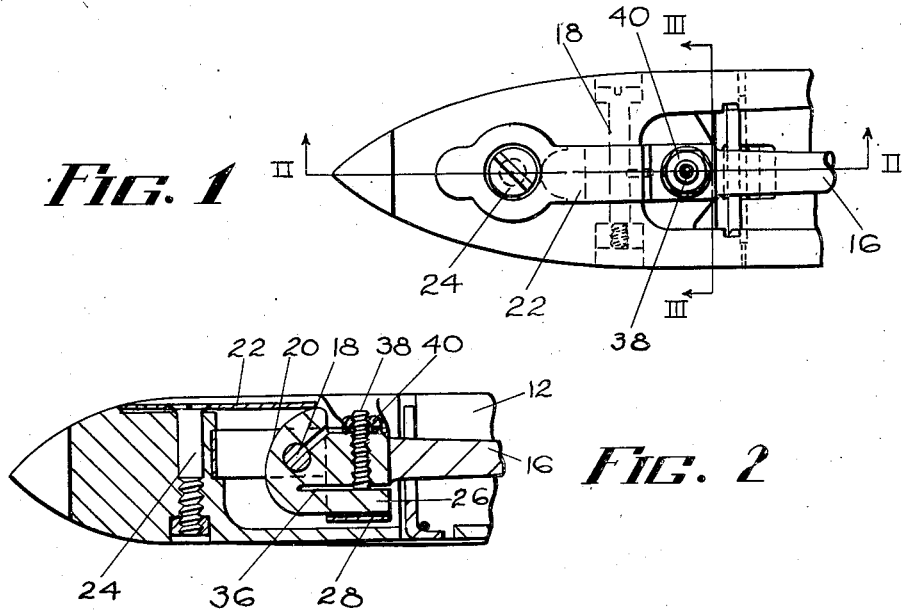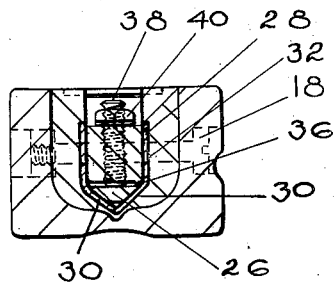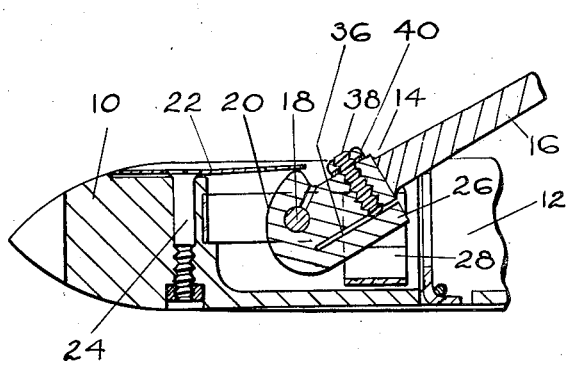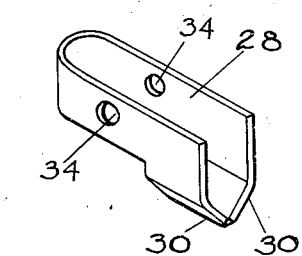

2,423,421

UNITED STATES PATENT OFFICE 2,423,421

LOOM SHUTTLE

Emerson B. Tifft, Hopedale, Mass., assignor to Draper Corporation, Hopedale, Mass., a corporation of Maine Application May 28, 1945, Serial No. 596,341

3 Claims. (Cl. 139—208)

The present invention relates to shuttles for use in fly shuttle looms and, as illustrated herein, relates more particularly to shuttles of the type wherein a pivoted spindle supports a filling carrying bobbin or cop.

Pivoted spindles of the type above referred to must be accurately aligned with the shuttle eye and such alignment must be maintained during operation of the loom if filling breakage is to be avoided. Various means have been heretofore proposed to align the spindle shank with the shutle eye or with the longitudinal axis of the shuttle. Some of these proposals have been reasonably successful in maintaining the desired alignment during operation of the loom, but in some cases the contacting areas between the different portions of the adjusting means were so small that excessive wear between the contacting surface resulted and hence the necessity for frequent adjustment resulted. In other cases, it has been necessary to move the spindle out of running position to permit adjustment of a stop member. This is objectionable since it was difficult to adjust the stop member accurately to align the spindle without making repeated adjustments. One object of the present invention is to provide a shuttle with improved means for quickly and easily aligning the bobbin or cop supporting spindle in its proper operating position in the shuttle and in providing substantially large contacting surfaces to reduce the necessity for frequent adjustments.

To this end, the pivoted end of the spindle is provided with a V-shaped portion at its lower end which fits into a holding or stop member having a similar portion for receiving and horizontally aligning the spindle. The V-shaped portion of the spindle end may be moved relatively to the main portion thereof to provide for vertical adjustment of the spindle while the spindle is in operating position. By the use of this construction, alignment of the spindle is easily and more accurately accomplished and a positive stop of large area is provided which will reduce the number of adjustments necessary to maintain the spindle in proper alignment.

With the above and other objects and features in view, the invention will now be described with particular reference to the accompanying drawings which illustrate a preferred embodiment of the invention and in which:

Fig. 1 is a plan view of a portion of a shuttle in which the present invention is embodied;

Fig. 2 is a view in section taken along the line II—II of Fig. 1;

Fig. 3 is a view in section taken along the line III—III of Fig. 1;

Fig. 4 is a view similar to Fig 2 but showing the spindle in position to receive a filling carrier; and Fig. 5 is a perspective view of the holder.

The present invention is illustrated as embodied in a shuttle 10 having a bobbin receiving recess 12 in which a pivoted spindle 14 is supported. The spindle 14 is provided with a shank 16 on which the bobbin (not shown) is supported. The spindle 14 is pivotally supported on a screw 18. The spindle 14 is provided with a cam surface 20 against which a spring 22 bears to maintain the spindle in either of the positions shown in Figs. 2 and 4. The spring 22 is normally bowed and is held in position in the shuttle by a vertical screw 24. The parts so far described are of usual construction.

The spindle 14 at its bottom portion 26 is V-shaped in cross section and fits into a holder or stop 28 which is V-shaped in cross section. The holder or stop 28 is preferably formed of sheet metal and is provided with a pair of depending wings 30 which are turned inwardly toward each other and are secured together by welding or the like. The inturned wings 30 form a V-shaped stop into which the portion 26 of the spindle fits as shown best in Fig. 3. The stop or holder 28 fits snugly into a longitudinal slot 32 formed in the shuttle body 10. The lower portion of the slot 32 is shaped to conform to the shape of the inturned wings 30. The slot 32, as best shown in Fig. 3 is undercut, thus preventing undesired vertical movement of the stop 28. Longitudinal or endwise movement of the stop 28 is prevented by the screw 18 which passes through openings 34 in the stop 28 and through an opening in the spindle 14.

As shown most clearly in Figs. 2, 3 and 4, the portion 26 of the spindle 14 is separated over the greater portion of its length from the main body of the spindle end by a slot 36. The main portion of the spindle end is provided with a vertical threaded hole which receives an adjusting screw 38, the lower end of which is hardened and arranged to bear against the portion 26 and to exert pressure there against. The portion 26 will move relatively to the main body of the spindle end when pressure is applied thereto by the screw 38, thus providing an adjusting means for determining the horizontal position of the spindle shank 16. Thus, the spindle shank 16 can initially be positioned in its proper position so that the axis of the spindle shank 16 coincides substantially with the axis of the shuttle 10. When the screw 38 is properly adjusted, it is locked in adjusted position by a lock nut 40. The contacting surfaces of the V-shaped portion 26 and the wings 30 are relatively great and wear thereon, consequently, is reduced to a minimum. As a result, the spindle is maintained in proper position for a relatively long period without further adjustment.

If, however, the spindle shank 16 is thrown out of alignment due, for example, to wear on the contacting surfaces of the portion 26 and the wings 30, the lock nut 40 is loosened and the screw 38 turned until the spindle shank 16 is again properly positioned. The lock nut 40 is then tightened to lock the screw 38 in adjusted position.

Having thus described my invention, what I claim as new and desire to secure by Letters Patent of the United States is:

1. A shuttle for looms having, in combination, a pivotally supported spindle having a base portion, said base portion having a main part and a lower part movable relatively thereto and having converging surfaces, means for pivotally supporting said spindle in normal operating position, a spring member for maintaining said spindle in said normal operating position, a stop member having a V-shaped portion having converging surfaces arranged to receive the lower part of the base portion of the spindle to position the spindle horizontally of the shuttle, and adjusting means for moving the lower part relatively to the main part of the base portion for positioning said spindle vertically in said normal operating position.

2. A shuttle for looms having, in combination, a pivotally supported spindle having a base portion, said base portion having a main part and a lower part movable relatively thereto and having converging surfaces, means for pivotally supporting the spindle in normal operating position, a spring member for maintaining said spindle in said normal operating position, a stop member having a V-shaped portion having converging surfaces for receiving the lower part of the base portion of the spindle to position the spindle horizontally of the shuttle, and a screw member threaded into said main part of said base portion and engaging the lower relatively movable part for moving said lower part relatively to the main part of the base portion to position said spindle vertically in said normal operating position.

3. A shuttle for looms having, in combination, a pivotally supported spindle having a base portion, said base portion having a main part and a V-shaped lower part movable relatively to the main part and having converging surfaces, means for pivotally supporting the spindle in normal operating position, a spring member for maintaining said spindle in said normal operating position, a stop member having a V-shaped portion having converging surfaces for receiving the V-shaped part of the base portion of the spindle to position the spindle horizontally of the shuttle, a screw member threaded into said main part of said base portion and engaging the lower relatively movable part for moving said lower part relatively to the main part of the base portion to position said spindle vertically in said normal operating position, and means for locking said adjusting screw in adjusted position.

EMERSON B. TIFFT.

REFERENCES CITED

The following references are of record in the file of this patent:

UNITED STATES PATENTS

| Number | Name | Date |
| --- | --- | --- |
| 1,838,387 | Gauvin | Dec. 29, 1931 |
| 1,941,317 | Pavia | Dec. 26, 1933 |

FOREIGN PATENTS

| Number | Country | Date |
| --- | --- | --- |
| 23,022 | Great Britain | 1902 |
| 520,492 | Great Britain | Apr. 25, 1940 |
| 525,071 | Great Britain | Aug. 21, 1940 |